United States Patent [19]

Morita et al.

[11] Patent Number: 4,705,445
[45] Date of Patent: Nov. 10, 1987

[54] APPARATUS FOR EXCHANGING METAL MOLDS

[75] Inventors: Tsuneharu Morita; Toshiharu Ikeyama, both of Suzuka; Osamu Iwaki; Hisao Katsuta, both of Nagoya, all of Japan

[73] Assignee: Kobayashi Bansokiki Co., Ltd., Nagoya, Japan

[21] Appl. No.: 759,057

[22] Filed: Jul. 25, 1985

[30] Foreign Application Priority Data

Jul. 30, 1984 [JP] Japan ............................ 59-116980[U]
Jul. 30, 1984 [JP] Japan ............................ 59-116981[U]

[51] Int. Cl.⁴ ............................................ B65G 65/00
[52] U.S. Cl. ................................... 414/280; 74/89.21;
104/162; 104/165; 198/346.1; 414/527
[58] Field of Search ............... 414/280, 281, 527, 661,
414/345, 499; 104/48, 96, 162, 165, 172 B;
74/89.21; 198/346.1, 465.1, 950

[56] References Cited

U.S. PATENT DOCUMENTS

| | | | |
|---|---|---|---|
| 1,556,294 | 10/1925 | Meehan | 104/48 |
| 1,624,098 | 4/1927 | Goldsmith et al. | 79/89.21 |
| 2,709,220 | 5/1955 | Spector | 74/501 X |
| 2,954,882 | 10/1960 | Dailey | 414/280 X |
| 3,677,423 | 7/1972 | Tollefsrud et al. | 104/172 B |
| 4,597,709 | 7/1986 | Yonezawa | 414/499 X |

FOREIGN PATENT DOCUMENTS

| | | | |
|---|---|---|---|
| 248801 | 7/1911 | Fed. Rep. of Germany | 104/162 |
| 47278 | 4/1977 | Japan | 414/281 |
| 544436 | 4/1942 | United Kingdom | 414/345 |

Primary Examiner—Robert J. Spar
Assistant Examiner—Stuart J. Millman
Attorney, Agent, or Firm—Kane, Dalsimer, Sullivan Kurcz, Levy, Eisele and Richard

[57] ABSTRACT

An apparatus is provided for exchanging metal molds for a molding machine that employs such molds. The apparatus includes a mold carriage capable of mounting thereon at least two metal molds and a mold transfer and exchange unit capable of transporting the mold to be exchanged from the carriage to the molding machine and to give and receive the molds horizontally. The apparatus includes a guide rail and an extension of said guide rail which pivots in a horizontal plane to effect the exchange of said molds.

11 Claims, 12 Drawing Figures

APPARATUS FOR EXCHANGING METAL MOLDS

BACKGROUND OF THE INVENTION

1. Field of the Invention

The present invention relates to an apparatus for exchanging metal molds for a molding machine employing metal molds, such as a press molding machine, an injection molding machine and so on. Such apparatus includes a mold carriage capable of mounting thereon at least two metal molds for the molding machine, said machine performing the molding using one of these molds under exchange with one another. Such apparatus also includes a mold transfer and exchange-transport truck capable of effecting the transport of the metal mold to be exchanged through the course between said carriage and the molding machine and to give and receive the metal mold horizontally.

2. Description of the Prior Art

In order to realize automation and energy economization in the operation of exchange of metal molds for a press molding machine such as the one disclosed in the Japanese Patent Publication Sho 55-4853, the inventors had been attempting to develop an apparatus for exchanging metal molds. The apparatus for exchanging metal molds previously proposed as mentioned above had the construction, in which a mold transfer and exchange-transport truck unit was arranged on one side of the press molding or on a mold storage rack which serves as a metal mold carriage, wherein said transfer and exchange-transport truck unit was provided with a conveying means capable of effecting to draw the metal mold out onto said transport truck or to push the metal mold on the truck forward onto the press molding machine. Thus, the apparatus consisted of a sprocket that serves as the driving wheel connected to the driving motor on one side of said transfer and exchangetransport truck in a bearing relation so as to permit rotation in a vertical plane and a guide rail formed in a box-shaped profile laid down on said transfer and exchange-transport truck which extends horizontally and tangentially to said sprocket. A chain, which is one embodiment of the above mentioned elongated member and which is permitted to slide inside said guide rail, is wound around said sprocket and arranged at the front end of said chain is a hook projecting upwards through the upper face of the guide rail for engagement with said metal mold, whereby the metal mold set in the molding machine or the one stored in the storage rack can be transferred onto said transfer and exchange-transport truck or vice versa, by rotating said sprocket to operate the chain.

Since the apparatus for exchanging metal molds mentioned above can also be used for injection molding machines, the apparatus according to the present invention is referred to hereinafter in this specification only as apparatus for a molding machine.

The conveying means consisting of an elongated member, a guide rail and a driving wheel mentioned above had an advantage that it permits the arrangement to be designed in smaller size, since the elongated member can be housed more easily by the yieldability thereof, notwithstanding that the length of the conveyance became greater, as compared with the conveying means employing a piston-cylinder combination. In addition, the transfer and exchange-transport truck was able to be handled as one having an apparently smaller size on transporting the metal mold, notwithstanding that the conveyance length on the transfer and exchangetransport truck unit was increased when an extension rail was employed.

In the mold transport truck unit of the previous proposal, an extension rail is employed for bringing the metal mold over to the molding machine in such a manner that the guide rail is extended straight by said extension rail to the molding machine so as to permit the hook for engagement with the metal mold to reach the molding machine. Heretofore, the setting of such extension rail had to be effected manually and has been one of the obstacles for realizing the automation of the mold exchange. In considering an automatic setting of such an extension rail, a technique that comes first into mind is one in which the so employed extension rail is held up while it is out of use. However, such a manner of holding up the extension rail may require an additional means for preventing the falling off thereof, resulting in a complication of the total construction. On the other hand, if the so assembled extension rail hangs down while it is out of use, the height of the transport truck will be restricted in accordance with the size of the metal mold, whereby the length of the extension rail will also be limited.

BRIEF SUMMARY OF THE INVENTION

The object of the present invention is to obviate the above difficulties and to provide an improved apparatus for exchanging metal molds for a molding machine under the employment of an extension rail segment permissible of realizing an automatic operation of the arrangement.

Thus, the present invention proposes a novel arrangement for exchanging metal molds for a molding machine, such as, a press molding machine, an injection molding and so on, which includes a mold carriage capable of mounting thereon at least two metal molds for the molding machine, said machine performing the molding using one of these molds under exchange with one another, and a mold transfer and exchange-transport truck unit capable of effecting to transport the metal mold to be exchanged through the course between said carriage and the molding machine and to give and receive the metal mold horizontally characterized in that said mold transfer and exchange-transport truck unit has a conveying means for giving and receiving the metal mold in a substantially horizontal level; that said conveying means comprises an elongated member having in itself a yieldability or a flexibility, such as a chain or a perforated plate spring, and a guide rail which houses said elongated member and functions to restrict the mobility of said elongated member due to said yieldability or flexibility and to permit a sliding movement of said elongated member inside thereof; and that an extension rail segment is arranged to succeed said guide rail, said extension rail segment consisting of a length of rail pivotally supported so as to allow a swinging movement thereof in a horizontal plane at least to one side direction to the mold carriage or to the molding machine.

According to the present invention, the conveying means for giving and receiving the metal mold in a horizontal level disposed on the transfer and exchange-transport truck unit is constituted of an elongated member having in itself a yieldability or flexibility, such as a chain or a perforated plate spring, and a guide rail capable of restricting the mobility of said elongated member and permitting a sliding movement of said elongated member and including an extension rail segment capable of extending the guide rail, wherein said extension rail segment consists of a length of rail pivotally supported so as to permit swinging movement thereof in a horizontal plane at least to one side direction to the molding machine or to the mold carriage.

Describing in more detail, said conveying means according to the present invention consists of a unit which comprises supporting on one side of the mold transfer and exchange-transport truck in a bearing relation a driving wheel capable of engaging with a driving motor so as to cause it to rotate in a vertical plane, laying the guide rail formed in a box-shaped profile down on said mold exchange-transport truck horizontally and tangentially to said driving wheel, winding said elongated member, which is slidable inside said guide rail, around said driving wheel and disposing at the front end of said elongated member a hook projecting upwards through the upper face of the guide rail for engagement with the metal mold, wherein said extension rail segment is pivotally supported on the other side of the transfer and exchange-transport truck so as to permit swinging motion thereof in a horizontal plane and wherein the power source for swinging said extension rail segment is arranged on the other side of the transfer and exchange-transport truck.

In order to cut down the time required for exchanging the metal mold, the apparatus according to the present invention employs in one preferred embodiment two mold transfer and exchange-transport trucks which constitute a combined exchange-transport truck unit, which is disposed on one (front) side of the molding machine so that a new and an old metal mold can be placed thereon simultaneously. It is convenient to utilize one transfer and exchange-transport truck of this combined unit at the same time as the mold carriage for storing the exchanged mold for some other use.

The apparatus according to the present invention can also be modified in such a manner, that the mold transfer and exchange-transporting truck unit is disposed both on the front and rear sides of the molding machine so as to permit simultaneous transference operation for both the new and old molds, in order to further cut down the requisite time for the exchange.

The employment of a chain for the elongated member and of a sprocket for the driving wheel according to the present invention will favor the exchange operation when the metal mold has a considerable weight. In a preferred embodiment of the conveying means according to the present invention, the guide rail thereof is arranged to extend to cover the sprocket so as to permit the hook for engagement with the metal mold to move beyond said sprocket further to the side of the transfer and exchange-transport truck, whereby every obstacle projecting out the truck is eliminated in order to favor the transportation of the metal mold also to the direction towards the sprocket side.

In one most preferred embodiment of the apparatus according to the present invention, two such conveying means are disposed on the truck in reverse direction with each other, to accomodate the case where the molding machine is positioned on the opposite side to the metal carriage with respect to the transfer and exchange-transport truck unit.

In one simple and convenient embodiment of the apparatus according to the present invention, the elongated member of the conveying means consists of a perforated plate spring and the driving wheel comprises a driving drum having hooks for engagement with the perforation of the plate spring.

The apparatus according to the present invention is suitable especially in employing for a molding machine for press molding or injection molding.

BRIEF DESCRIPTION OF THE DRAWINGS

The drawings appended illustrate examples of the apparatus according to the present invention, in which:

FIGS. 10–12 illustrate an embodiment in which a perforated plate spring and a hooked driving drum are used as the conveying means and, in which

DETAILED DESCRIPTION OF THE PREFERRED EMBODIMENTS

Figure 3:
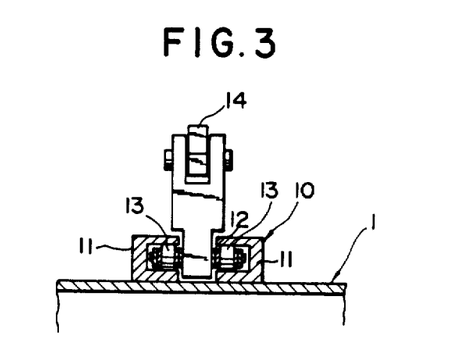
FIG. 3 is an enlarged sectional view along line B—B of FIG. 1.
Figure 4:
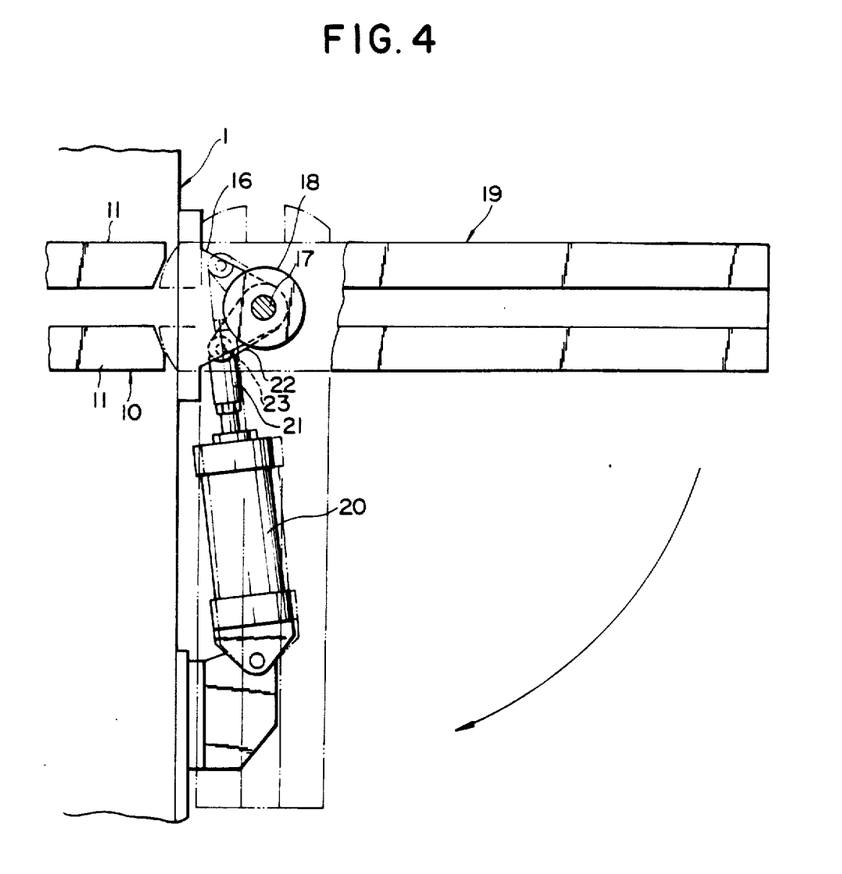
FIG. 4 is an enlarged view of a portion of FIG. 1.

In the first example shown in FIGS. 1–5 according to the present invention, the mold transfer and exchange-transport truck unit 1 self-travels on the rail way 2, 2 and can settle itself in front of a molding machine, such as a press molding machine or an injection molding machine, or in front of a mold carriage, such as, a mold rack (not shown) etc. On the truck 1, four lines of roller conveyers 4 are disposed on which the metal mold 5 for the molding machine is mounted. On one side of the truck unit 1 opposed to the molding machine 3, bearing means 6 are disposed in which a driving shaft 7 is supported horizontally. The driving shaft 7 is provided fixedly with a sprocket 8 to serve as the driving wheel and is connected at its one end to the driving motor 9 equipped with a reduction gear means. Therefore, the sprocket 8 can be rotated in a vertical plane by the output power of the driving motor 9. On the truck unit 1, a pair of guide rails 10 each having a box-like sectional form are laid down in a direction parallel to the roller conveyers 4 and extending tangentially to the sprocket 8. The guide rail is constructed so that a pair of long profile rods 11 each have a U-shaped sectional form are placed parallel opposingly to face the open grooves with each other, as shown in FIG. 3, between which a chain serves as the elongated member having a yieldability is inserted in such a manner that the rollers 13 disposed on the both lateral sides of the chain 12 are rotatable freely within the guide rail, namely the profile rods 11. In this manner, the chain 12 is arranged within the guide rail 10 freely slidable but restricted in its yieldability. The chain 12 is wound around the sprocket 8 and is provided at the front end with a hook 14 projecting upwards through the space between said pair of profile rods 11 for engagement with the metal mold to be exchanged. In this way, the hook 14 will be slid along the guide rail 10 when the chain 12 is moved sliding within the guide rail by rotating the sprocket 8. The metal mold mounted on the truck will be moved under engagement of the engagement means 15 provided on one side thereof with the hook 14 by the movement of the hook 14.

Figure 5:
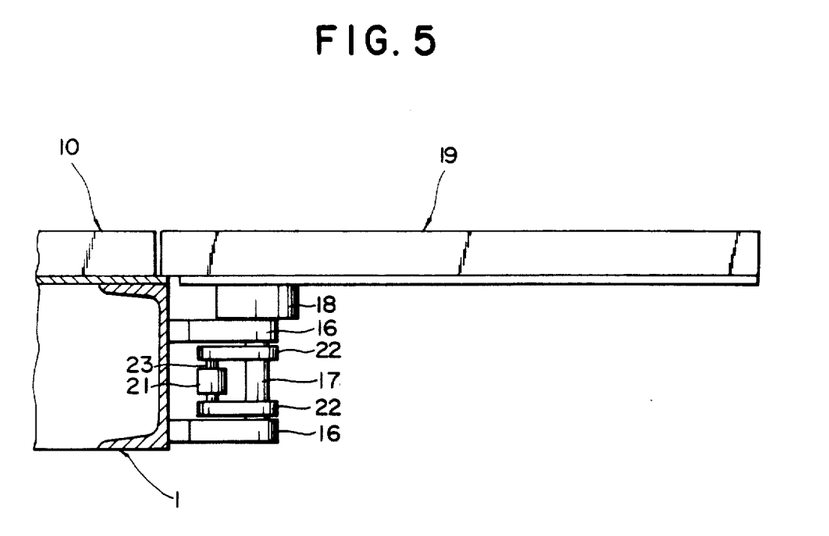
FIG. 5 is an enlarged sectional view along line C—C in FIG. 1.

On the other side of the truck unit 1 opposing to the molding machine 3, a pair of bearings 16 are disposed projectingly, in which a supporting shaft 17 is vertically supported pivotingly, as shown in FIG. 5. On the head block 18 at the top of the supporting shaft 17 is mounted an extension rail segment 19. The extension rail segment 19 has the same sectional form as the guide rail 10 and can succeed the guide rail straight on. The front end of the extension rail segment reaches close to the bolster of the molding machine 3. The extension rail segment 19 is moved swinging around the supporting shaft 17 in a horizontal level by actuating an operating cylinder 20, the piston rod of which is pivoted at its front ends 21 on a lever 22 fixed to the supporting shaft 17 with a pin 23.

When operating the mold transfer and exchangetransport truck unit, the extension rail segment 19 is positioned so as to succeed the guide rail 10 straight on to form an extension of the guide rail 10 by actuating the cylinder 20 to move the piston rod therefor for bringing the metal mold 5 mounted on the truck 1 placed fixedly in front of the molding machine 3 over thereto. The metal mold 5 is pushed towards the molding machine 3 by moving the hook 14 by sliding the chain 12 within the guide rail 10 by rotating the sprocket 8. The metal mold 5 will be transferred guided on the roller conveyer 4 onto the die lifter 24 arranged on the bolster of the molding machine 3. Here, the hook 14 will travel along the guide rail 10 passing beyond the front end thereof into the extension rail segment 19 so as to perform the pushing conveyance of the metal mold 5 up to the predetermined setting position in the molding machine 3.

For transferring the metal mold which is set in the molding machine 3 onto the transfer and exchangetransport truck unit 1, the hook 14 of the conveying means is caused to engage with the metal mold in the same manner as above and is moved by actuating the sprocket 8 in reverse direction.

The extension rail segment 19 can be turned aside by actuating the piston rod in the cylinder 20, as shown in the drawing by the imaginary lines, around the supporting shaft 17 to lay aside on the side face of the truck unit 1. In this manner, the truck unit 1 can be moved along the rail way 2, 2 between a mold carriage, such as a mold storage rack (not shown) and the molding machine without being obstructed by the extension rail segment 19.

By the arrangement of extension rail segment 19 projecting from the side face of the truck unit 1 swinging in a horizontal level, a greater length of the extension rail segment 19 can be attained, as compared with the case in which it is arranged swinging in a vertical plane, due to the construction of the molding machine, so that the automation of the mold exchange can be realized by a more simple construction, even if the distance between the truck unit and the molding machine is greater.

Since the extension rail segment 19 is mounted on the head block at the upper end of the supporting shaft 17 supported vertically in a pivoted manner by the bearing 16, the support of the extension rail 19 in a vertical plane is made stout in spite of that the rotational operation of the extension rail segment 19 in a horizontal plane is light and smooth, what makes it possible to attain the operation and arrangement of the extension rail segment 19 easily by a simple structure.

Figure 1:
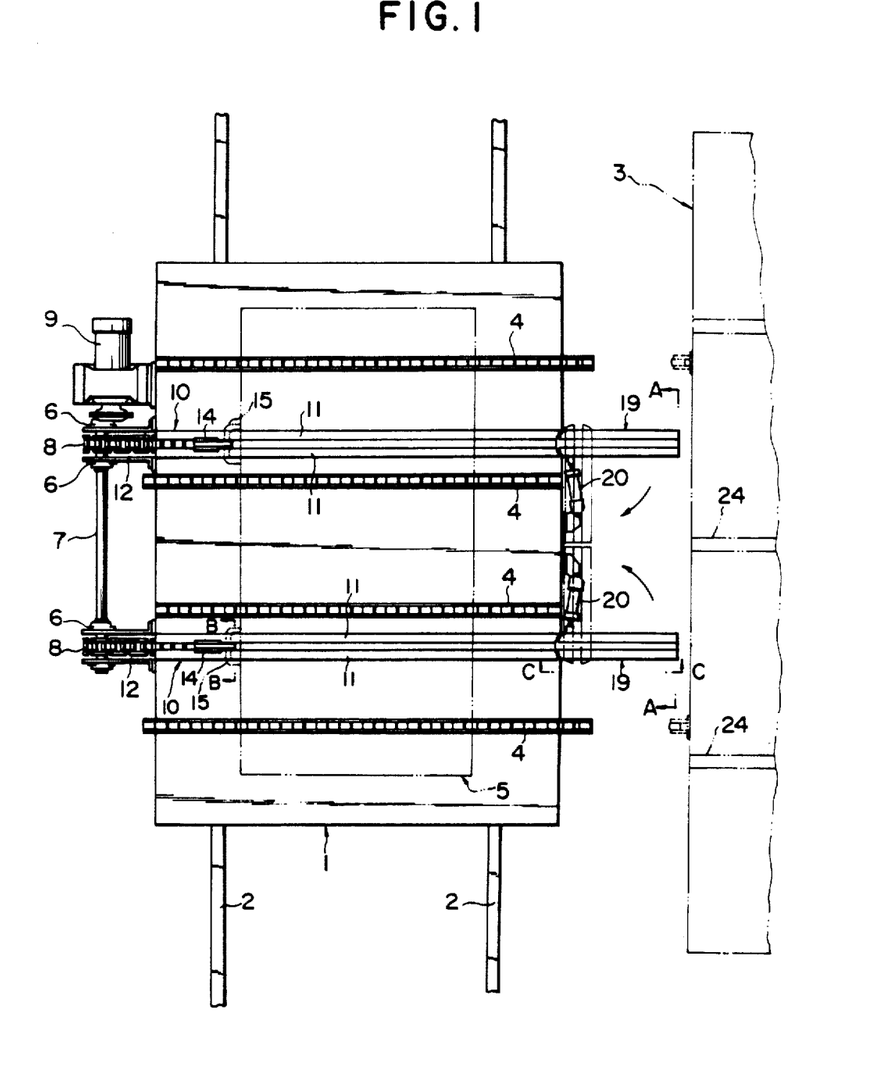
FIG. 1 is a plan view of the essential parts of one embodiment of the apparatus.
Figure 2:
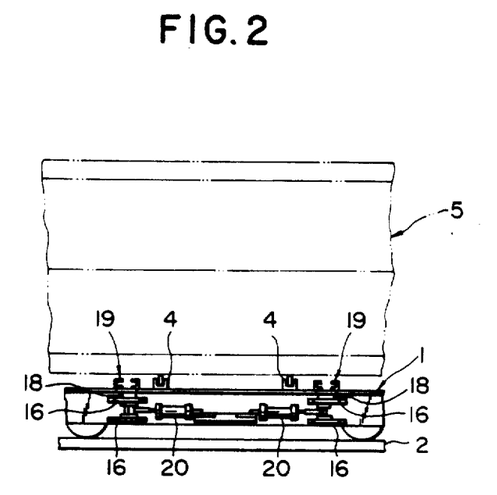
FIG. 2 is a partly cut-off front sectional view along line A—A in FIG. 1.

Although in the example in FIG. 1 only one mold transfer and exchange-transport truck unit is placed in front of the molding machine 3, it is possible to employ two such truck units as a combined truck unit (not shown), in which one truck serves for the new mold and the other one for mounting the old replaced mold, so that the time required for exchanging the metal mold will be cut down as compared with the case where a "single" truck unit is employed. Here, a further advantage may be realized, in which one truck of the combined truck unit is utilized as a mold carriage to store one metal mold always on the combined truck unit, when two metal molds 5, 5 are used alternately for the molding.

If such a mold transfer and exchange-transport truck unit 1 is arranged not only on one side (front side) but also on the other side (rear side), a greater economization of the requisite time for exchanging the mold can be attained, since the transference of the new mold from one truck unit 1 on the front side to the molding machine 3 can be effected during the old one is transferred therefrom onto the other truck unit on the rear side.

The conveying means in the example shown in FIG. 1 consists of a chain 12 and a sprocket 8 and thus is suitable from its structure for working for a heavy mold, this can be modified in the manner as given by another example as shown in FIGS. 6-9.

Figure 8:
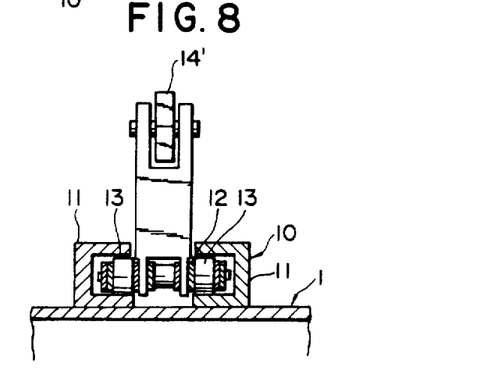
FIG. 8 is an enlarged sectional view along line E—E in FIG. 6.

Thus, the conveying means of the mold transfer and exchange-transport truck unit 1' in the example shown in FIGS. 6-9 is composed of a pair of guide means, each of which consists of a guide rail composed of an upper side guide rail section 10, a turning guide rail section 10' running around the sprocket 8 and an underside guide rail section 10", and of a chain 12 provided at a suitable portion thereof with a hook 14' for engagement with the sprocket 8, as shown in FIG. 8. The conveying means of this example can realize that the hook 14' for engagement with the metal mold will be moved along the outer face of the guide rail till beyond the turning section 10', so that the upper side guide rail has no projecting obstacle and thus, no restriction is placed for the movement of the metal mold to both the sides of the truck unit, so that the operation of mold exchange can be achieved more easily than the example shown in FIG. 1.

Figure 6:
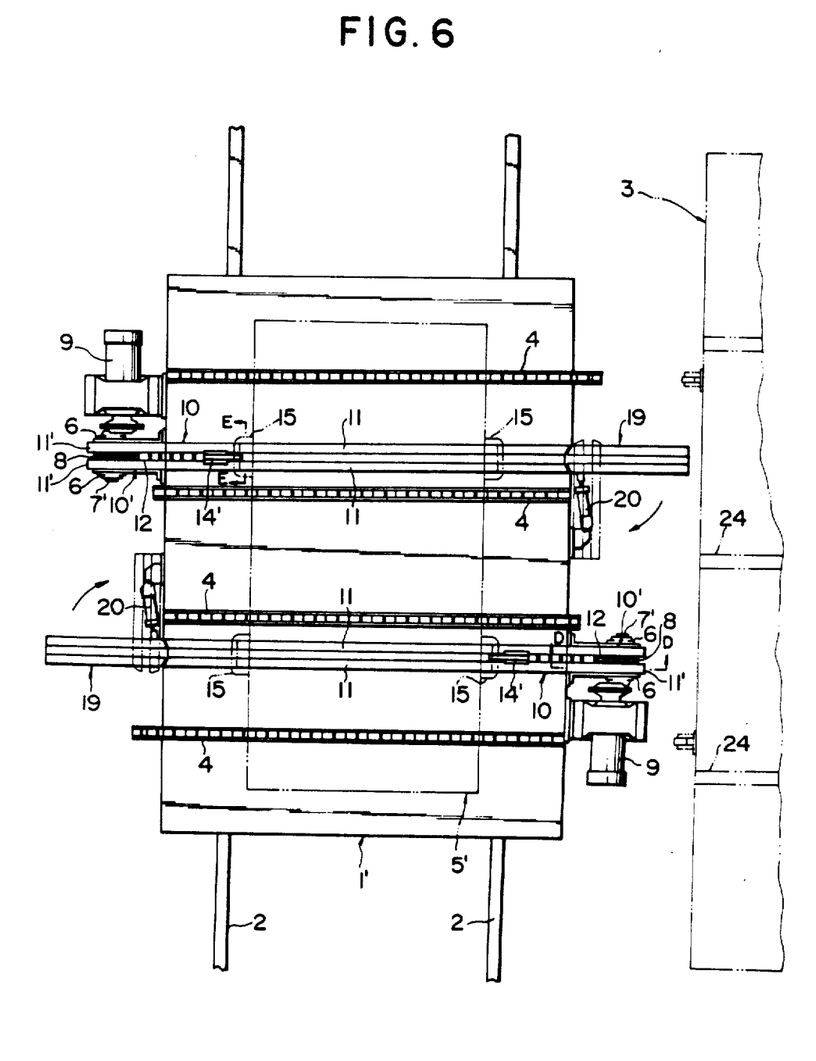
FIG. 6 shows another example of the apparatus according to the present invention in plan view.
Figure 7:
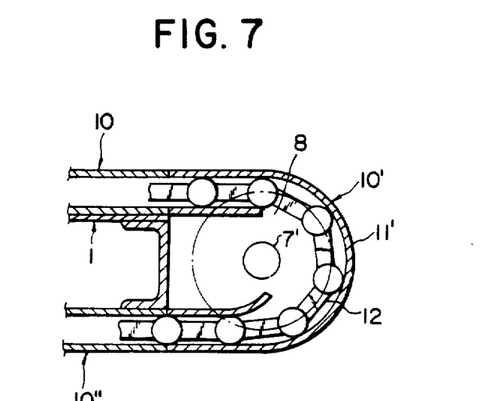
FIG. 7 is an enlarged sectional view along line D—D in FIG. 6.

As shown in FIG. 6, two such conveying means are utilized in this example disposed parallel in reverse direction with each other, so that the apparatus will favor for the case, in which the mold carriage such as a storage rack (not shown) is located on the side of the mold transfer and exchange-transport truck unit opposite to the molding machine 3, since this apparatus provides for the transference in both directions. This apparatus will widen the application possibilities thereof upon realizing the automation of the mold exchange operation.

Here, it is natural that the engagement member 15 of the metal mold 5' should be disposed on the both sides thereof. In this example, each conveying means has a sprocket 8 arranged on the truck unit 1' on the opposite side to each other, so that the driving motor 9 equipped with a reduction gear means may be arranged separately. However, only one driving motor 9 can be employed if the both sprockets 8 can be driven independently with each other by interposing a clutch means (not shown).

Figure 9:
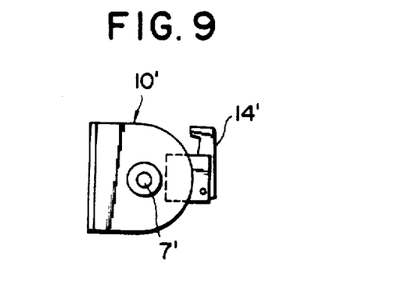
FIG. 9 illustrates the relative position between the hook for engagement with the metal mold and the guide rail when the hook is positioned around the sprocket.

While in this example the two sets of conveying means are arranged in the opposite direction with each other, the two can be driven in the same direction for moving the metal mold towards one direction. However, even though it is not avoidable to actuate only one of them due to the occasional condition, such as localized mounting of the metal mold on the truck 1' etc., an occurrence of excessive eccentric moment may be prevented by the roller conveyers 4. Here, it is of course necessary to put the hook 14' for the engagement with the metal mold of the other conveying means aside from the upper face of the guide rail 10 as shown in FIG. 9.

Figure 10:
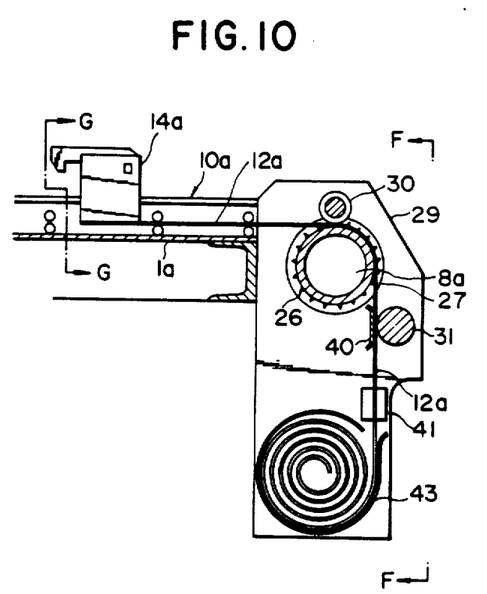
FIG. 10 is a sectional side view along the line H—H of FIG. 11.
Figure 11:
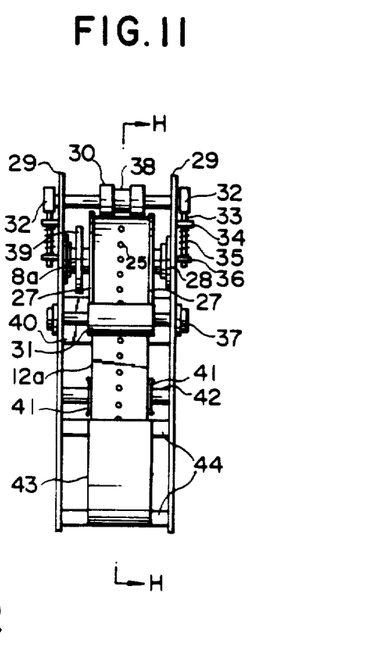
FIG. 11 is a front view from line F—F in FIG. 10
Figure 12:
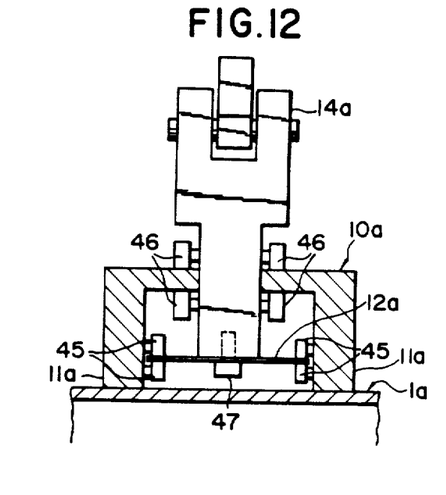
FIG. 12 is a sectional view along line G—G in FIG. 10.

In FIGS. 10–12, a further example of conveying means according to the present invention is shown. In this example, a perforated plate spring 12a having a flexibility is employed for the elongated member and a driving drum 8a provided with hooks 26 to be engaged with the perforations 25 of the spring 12a are used. This conveying means may be suitable for exchanging light weighing metal molds.

The driving drum 8a provided with hooks 26 is furnished with a pair of guide flange 27 for guiding the perforated plate spring 12a and supported freely rotatably by a pair of bearings 28 in the side frames 29, 29 and operates as a driving wheel actuated by the toothed wheel 39 driven by a driving source (not shown). The perforated plate spring 12a is wound around the driving drum 8a. In order to assure the engagement of the hooks 26 of the driving drum 8a with the perforations 25 of the plate spring 12a, an upper press roller 30 and a lateral press roller 31 are provided.

The upper press roller 30 has a groove 38, in order to prevent contact thereof with the hooks 26 of the driving drum 8a, as shown in FIG. 11, and is supported by a spring 35 elastically, in order to adjust the pressure onto the plate spring. Thus, each of the bearings 32, 32 for supporting the press roller 30 in freely rotatable relation is provided with a supporting pin 33 inserted freely slidably in a bracket 34 disposed in the side frame 29 and is supported by a spring seat 36 under insertion of a helical spring 35 to support the bearing 32 elastically. The pair of bearings 32, 32 are slidably supported in the side frame 29, 29 through an elongated slat (not shown).

The lateral press roller 31 is positioned below the driving drum 8a, as shown in FIGS. 10 and 11, and is arranged in opposition to a side plate 40 fixed at its ends on both the side frames 29, 29, so as to press upon the perforated plate spring 12a, is and supported in the side frames 29, 29 freely rotatably by a pair of bearings 37.

While in this example a guide rail 10a having a box-shaped profile is also provided on the mold transfer and exchange-transport truck unit 1a, as in the example of FIG. 1, this is composed here of a pair of angle rods 11a having an L-shaped section. In order to restrict the flexibility of the perforated plate spring 12a and to guide it freely slidably inside the guide rail 10a, side rollers 45, 45 for supporting the plate spring are arranged so as to hold the both edges of the perforated plate spring 12a between them.

The perforated plate spring 12a carries at its front end a hook 14a for engaging with the metal mold by fixing it with a fixation means 47, 47. The hook 14a is furnished with a pair of rollers 46, 46 to ease and to make stable the sliding movement thereof along the guide rail 10a.

The other end of the perforated plate spring 12a is inserted in a cylindrical cartridge 43 which is fixed by a supporting frame 44 on the side frames 29, 29, so as to permit storing of the plate spring 12a under coiling up in the cartridge when the plate spring is retracted therein. A pair of guiding side plates 42, 42 may preferably be disposed for guiding the perforated plate spring 12a into or out of the storage cartridge 43.

On the extension rail segment (not shown) for this example, members corresponding to the side rollers 45, 45 for guiding the plate spring may preferably be arranged and should advantageously have a sectional form having a closed bottom to form box-shaped profile.

The mold exchange apparatus as exemplified above can be utilized not only for molding machines for press molding and injection molding advantageously, but also for many other molding machines employing metal molds.

It is possible that the mold carriage is utilized also as a preheating station for preheating the metal mold if a heating device is incorporated in the mold carriage in using it for an injection molding machine.

What is claimed is:

1. An apparatus for exchanging metal molds for a molding machine which performs molding operations using at least one such mold; said apparatus including a mold carriage capable of having mounted thereon at least two metal molds and a mold transfer and exchange-transport truck unit capable of horizontally transporting a metal mold to be exchanged with said one mold in said molding machine between said carriage and said molding machine, wherein said mold transfer and exchange-transport truck unit includes a conveying means for giving and receiving each metal mold in a horizontal plane; said conveying means comprising a guide rail, an elongated yieldable or flexible member mounted for sliding movement along said guide rail, and an extension rail segment mounted for pivotal movement to a vertical support shaft disposed on said mold transfer and exchange-transport truck unit on a side facing said molding machine; said vertical shaft being positioned so as to permit said extension rail segment to swing into a position aligned with and forming an extension of said guide rail.

2. An apparatus in accordance with claim 1 further comprising actuator means for effecting the horizontal swinging movement of the extension rail segment relative to said mold transfer and exchange-transport truck unit, and said conveying means comprises a driving wheel disposed for rotation in a vertical plane and supported on a horizontal driving shaft mounted on said mold transfer and exchange-transport truck unit on a side opposite to said extension rail segment; said guide rail is formed in a box-shaped sectional profile and disposed on said mold transfer and exchange-transport truck unit horizontally and tangentially to said driving wheel; said elongated member including a portion thereof wound about said driving wheel so as to permit axial sliding movement inside said guide rail; and further comprising a hook connected to said elongated member at the end opposite said driving wheel, said hook projecting upwardly through an upper face of said guide rail for engaging said metal molds.

3. An apparatus according to claims 1 or 2, wherein two mold transfer and exchange-transport trucks are arranged in pair on one side of said molding machine so as to constitute together a combined transfer and exchange-transport truck unit.

4. An apparatus according to claims 1 or 2, wherein one exchange-transport truck in said combined exchange-transport truck unit is utilized as the mold carriage.

5. An apparatus according to claims 1 or 2, wherein mold transfer and exchange-transport truck units are arranged on front and rear sides of said molding machine.

6. An apparatus according to claim 2, wherein the elongated member of the conveying means consists of a chain and the driving wheel is a sprocket.

7. An apparatus according to claim 6, wherein the guide rail of said conveying means is arranged to cover said sprocket and said hook for engagement with the metal mold is arranged to permit movement beyond said sprocket towards the side of the exchangetransport truck.

8. An apparatus according to claim 7, wherein two conveying means are employed and are disposed on said mold transfer and exchange-transporting truck in reverse direction with each other.

9. An apparatus according to claim 2, wherein the elongated member of said conveying means consists of a perforated plate spring and the driving wheel is a driving drum having hooks to engage with the perforations in said spring.

10. An apparatus according to either one of claims 1, 2, 6, 7, 8 and 9, wherein the molding machine is a press molding machine and the metal mold is a press metal mold.

11. An apparatus according to either one of claims 1, 2, 6, 7, 8 and 9, wherein the molding machine is an injection molding machine and the metal mold is an injection metal mold.

* * * * *

UNITED STATES PATENT AND TRADEMARK OFFICE
CERTIFICATE OF CORRECTION

PATENT NO. : 4,705,445
DATED : November 10, 1987
INVENTOR(S) : Tsuneharu Morita, et al It is certified that error appears in the above-identified patent and that said Letters Patent is hereby corrected as shown below:

On the title page assignee should read

--(73) Assignee: Kobayashi Hansokiki --.

Signed and Sealed this

Fifth Day of July, 1988

*Attest:*

*Attesting Officer*

DONALD J. QUIGG

*Commissioner of Patents and Trademarks*